(12) United States Patent
Müller

(10) Patent No.: US 8,387,551 B2
(45) Date of Patent: Mar. 5, 2013

(54) DOUBLE TRIM TAB

(76) Inventor: Peter Müller, Gattikon (CH)

( * ) Notice: Subject to any disclaimer, the term of this patent is extended or adjusted under 35 U.S.C. 154(b) by 670 days.

(21) Appl. No.: 12/529,974

(22) PCT Filed: Mar. 5, 2007

(86) PCT No.: PCT/CH2007/000120
§ 371 (c)(1),
(2), (4) Date: Oct. 27, 2009

(87) PCT Pub. No.: WO2008/106807
PCT Pub. Date: Sep. 12, 2008

(65) Prior Publication Data
US 2010/0101475 A1 Apr. 29, 2010

(51) Int. Cl.
*B63B 1/18* (2006.01)
*B63B 1/20* (2006.01)
*B63B 1/22* (2006.01)
*B63B 39/00* (2006.01)
*B63B 39/06* (2006.01)

(52) U.S. Cl. ........................... 114/285; 114/286
(58) Field of Classification Search .................. 114/271, 114/274–287, 126
See application file for complete search history.

(56) References Cited

U.S. PATENT DOCUMENTS

| | | | | |
|---|---|---|---|---|
| 3,002,485 A * | 10/1961 | Curtis | .......................... | 114/285 |
| 3,313,262 A | 4/1967 | Yunker et al. | | |
| 3,370,561 A * | 2/1968 | Ilon | .......................... | 114/285 |
| 3,372,663 A * | 3/1968 | Lo Bue | .......................... | 114/285 |
| 3,391,667 A * | 7/1968 | Lo Bue | .......................... | 114/285 |
| 3,565,030 A * | 2/1971 | Curtis | .......................... | 114/285 |
| 3,628,486 A * | 12/1971 | Bennett | .......................... | 114/285 |
| 3,628,487 A | 12/1971 | Bennett | | |
| 3,738,301 A | 6/1973 | Sjoo | | |
| 4,597,742 A * | 7/1986 | Finkl | .......................... | 440/61 R |
| 5,193,478 A | 3/1993 | Mardikian | | |
| 5,628,272 A | 5/1997 | Thomas | | |
| 6,006,689 A | 12/1999 | Olofsson | | |
| 6,805,068 B1 * | 10/2004 | Tossavainen | .................. | 114/274 |
| 7,013,825 B1 | 3/2006 | Alessandro | | |
| 2003/0127035 A1 | 7/2003 | Simard | | |
| 2004/0014376 A1 | 1/2004 | Noyes | | |
| 2006/0217011 A1 | 9/2006 | Morvillo | | |

FOREIGN PATENT DOCUMENTS

| | | |
|---|---|---|
| DE | 19753926 C1 | 5/1999 |
| TW | 499382 B | 8/2002 |
| WO | 9620105 | 7/1996 |

OTHER PUBLICATIONS

International Search Report for PCT/CH2007/000120.

* cited by examiner

*Primary Examiner* — Ajay Vasudeva
(74) *Attorney, Agent, or Firm* — McCormick, Paulding & Huber LLP

(57) ABSTRACT

The invention involves a double trim tab for watercraft in which connection the flow interceptor (1) is activated by an actuation cylinder (4) and the flow interceptor (1) activates the bottom tab (2). One of the tabs may have a course correction device (10) or a course correction fin (11). In addition, an electronic steering device (14) can likewise carry out a course correction in the event of a trim change in which connection the steering wheel (17) is kept neutral by means of an uncoupling device (18).

16 Claims, 5 Drawing Sheets

DOUBLE TRIM TAB

CROSS REFERENCE TO RELATED APPLICATION

This application claims the priority of PCT Application No. PCT/CH2007/000120, filed on Mar. 5, 2007, the disclosure of which is incorporated herein by reference in its entirety.

FIELD OF THE INVENTION

The invention is based on a double trim tab for watercraft, in which lifting movement of an interceptor occurs by an actuation cylinder.

BACKGROUND OF THE INVENTION

Trim tabs are used to improve the glide angle of watercraft, which by changes in the direction of flow shift the corresponding uplift zones in order to facilitate more favorable weight distribution and or to start the vehicle gliding faster, as described in U.S. Pat. No. 3,628,487 or U.S. 2004/0014376 A1.

Recently other systems have also been marketed, such as submersible flow interceptors, described in Patent TW499382B or also U.S. Pat. No. 6,006,689.

SUMMARY OF THE INVENTION

The invention is designed to achieve effective trimming with the greatest possible uplift and lowest resistance values both at slow and high speeds with a trim tab for watercraft of the kind mentioned at the start. The trim tab is at the same time to be simplified by kinematics, which make it possible to accomplish the various objectives with only one hydraulic cylinder and reduce or eliminate course deviations as a result of the trimming.

Flow interceptors prove their worth at slower speeds, since they rapidly produce uplift and generate little resistance. At higher speeds conventional trim tabs have an advantage, since these, as an effective extension of the watercraft length, are more efficient at trimming while at the same time generating less resistance than the flow interceptor version.

However, trim tabs create an undesirable side effect, when they are not raised or lowered in parallel, of diverting the course of the watercraft as a result of uplift and resistance differences between the starboard and port sides, a circumstance which is actually used as an aid to steering in various applications in large jet-propelled watercraft. However for trimming conventional craft, this side effect is extremely inconvenient, since it forces the operator to make a steering correction every time the trim tabs—whether flow interceptor or tab—are activated in order to keep the craft on a given course.

The double tab, which on the one hand is in form of a flow interceptor and in the first phase also acts as one, and which on the other hand acts as a standard tab in the event of a greater performance requirement, with both tabs being operated by a single actuator. The double tab thus creates the desired trim at an economical price and by means of the built-in course correction device, the watercraft continues on the course chosen in the event of trim alteration without significant counter-steering measures being required.

The double trim tab does not require any special alloys and can be manufactured from corresponding corrosion-proof metal or plastic or from a combination of both materials.

With this invention, this is achieved by the characteristics of the first claim, which optimize the trim of a watercraft by means of two tabs or at least one tab that possesses a course correction device.

The basic objective of the invention is to achieve the greatest possible efficiency in the trimming of a watercraft as far as possible over the entire trim area by means of a double trim tab and at the same time to integrate corresponding automatic course correction guidance.

Further advantageous characteristics of the invention arise from the subclaims.

BRIEF DESCRIPTION OF THE DRAWINGS

Design examples of the invention are explained in more detail below on the basis of drawings. Identical elements in the various figures are provided with identical reference marks.

DESCRIPTION OF THE PREFERRED EMBODIMENTS

Figure 1:
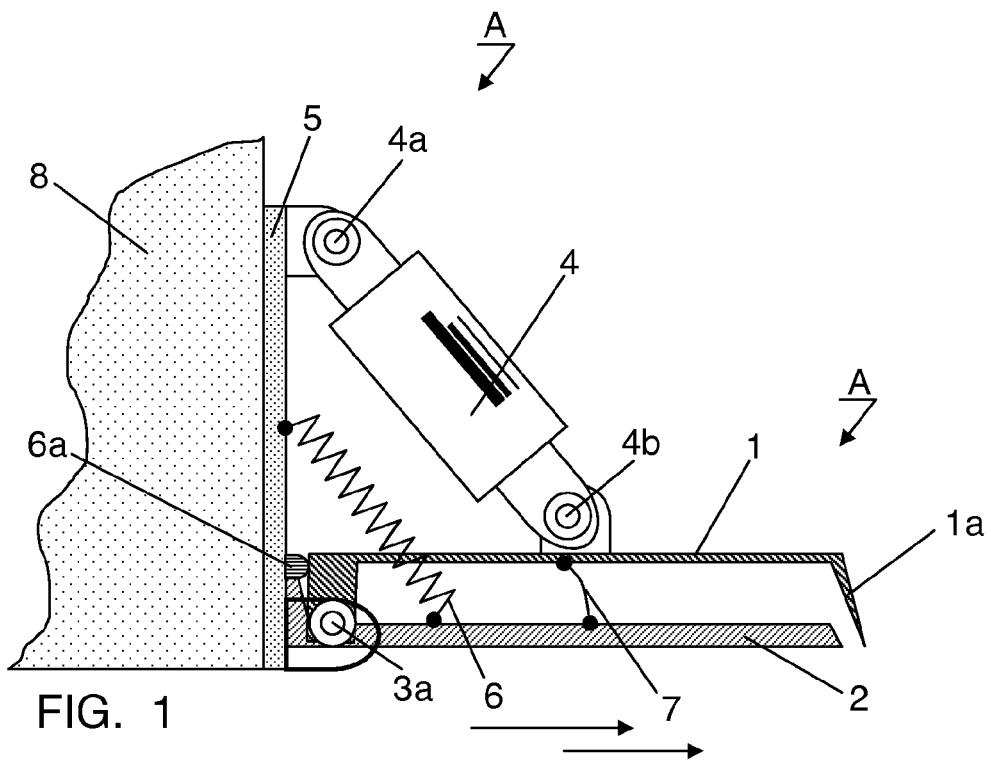
FIG. 1 is a side elevation of a double trim tab with the most important elements for the trim function

FIG. 1 shows a side elevation of double trim tab A in the starting position, consisting of flow interceptor 1 and bottom tab 2 and which are hinge-mounted via hinge 3a. Actuator cylinder 4 is attached to flow interceptor 1, hinge-mounted by bearing 4a, 4b, with actuation cylinder 4 being supported on transom 5.

Return spring 6 is located on bottom tab 2 to guarantee that bottom tab 2 is located at limit stop 6a when not in use, thereby facilitating a defined alignment to water flow. In addition, bottom tab 2 is connected via flexible connecting device 7 with flow interceptor 1 so that even in the event of spring force losses bottom tab 2 can be completely raised by means of actuation cylinder 4 and the water flow, represented by arrows, can flow away unhindered behind the watercraft.

Actuation cylinder 4 can also be supported directly on stern 8 of a watercraft. Actuation cylinder 4 can be an electric drive or a fluid cylinder. If actuation cylinder 4 is a fluid cylinder, it can be equipped with a mechanical lock not shown, so that in the event of a leak or pressure loss the trim does not drift off.

Return spring 6 can be a longitudinal compression or tension spring or a torsion spring or similar.

Figure 2:
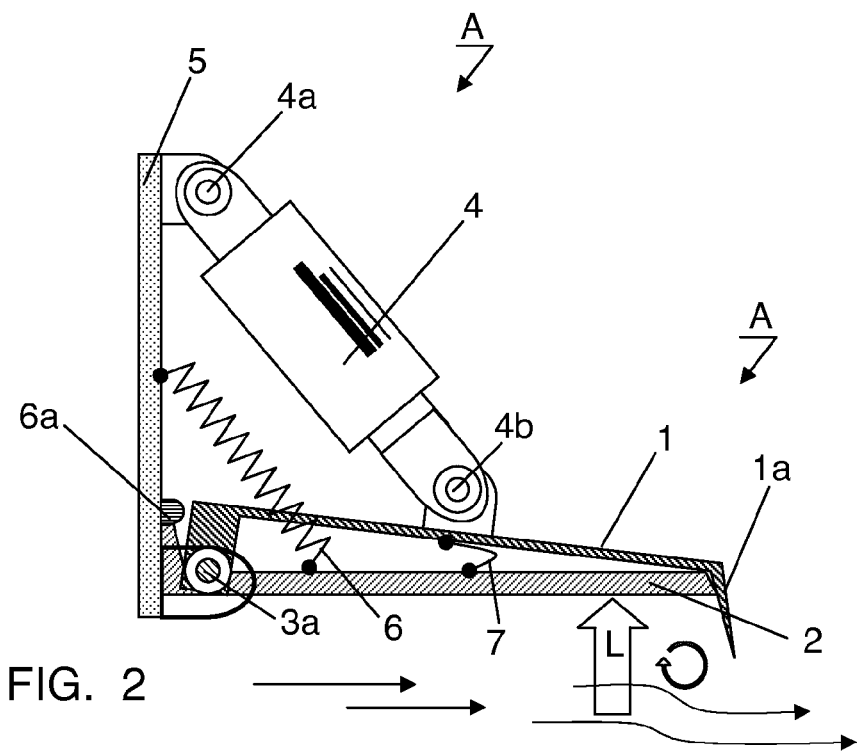
FIG. 2 is a side elevation of a double trim tab with the activated flow interceptor

FIG. 2 shows a side elevation of double trim tab A with the activated flow interceptor 1. By activation of actuation cylinder 4 via switch 12 or via electronic position sensor 13, flow interceptor 1 is lowered and as a result flow interceptor end 1a as well and develops flow resistance as well as uplift components, shown by arrow L. Bottom tab 2 does not move, on the one hand due to the upward pressure of the water flow and on the other due to return spring 6 and limit stop 6a. The flexible connecting element 7 bends or folds accordingly as a result of the lowering of flow interceptor 1.

Figure 3:
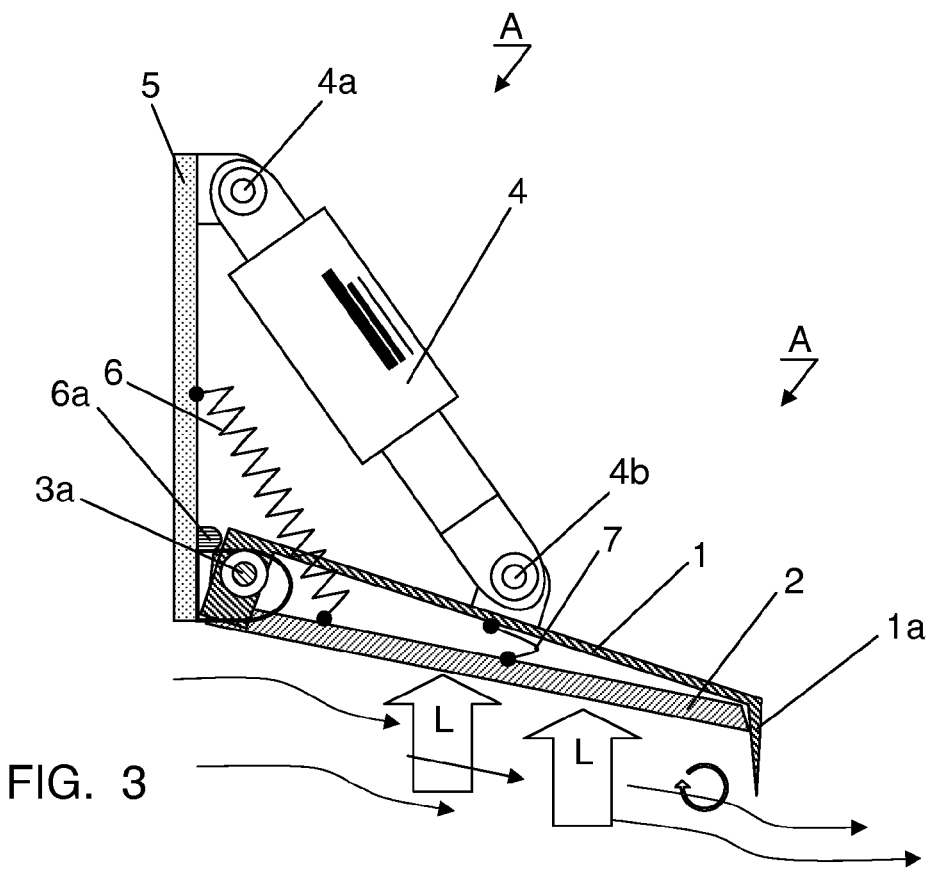
FIG. 3 is a side elevation of a double trim tab with the activated flow interceptor and activated bottom tab

FIG. 3 shows a side elevation of double trim tab A with the activated flow interceptor 1 and activated bottom tab 2. By activating actuation cylinder 4 which presses flow interceptor 1 on bottom tab 2, bottom tab 2 is pressed downwards against spring 6 by the continued extension of actuation cylinder 4 until actuation cylinder 4 has been fully extended.

As a result, the uplift increases further—represented by arrow L—and the trimming of the watercraft is also increased.

Figure 4:
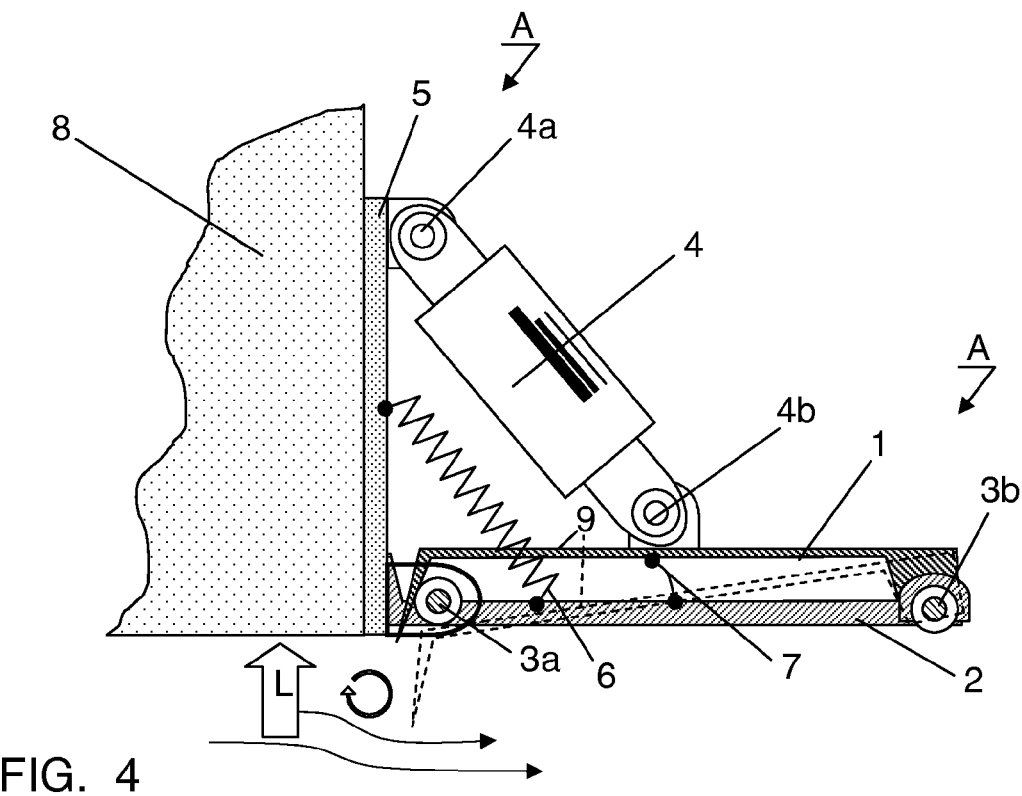
FIG. 4 is a side elevation of a double trim tab with the activated flow interceptor with flow interceptor suspended and lowering of flow interceptor indicated

FIG. 4 shows a side elevation of another version of the double trim tab A described in FIG. 1-3, consisting of front flow interceptor 9 and bottom tab 2, mounted via hinges 3a, 3b. Hinge-mounted actuation cylinder 4 is attached to front flow interceptor 9 by bearings 4a, 4b, just as in double trim tab A presented in FIG. 1-3.

The broken line represents the lowering of front flow interceptor 9, which in this case activates the flow interceptor end 1a before bottom tab 2, namely directly at stern 8 of the watercraft and as a result bottom tab 2 acts in an ancillary manner.

Figure 5:
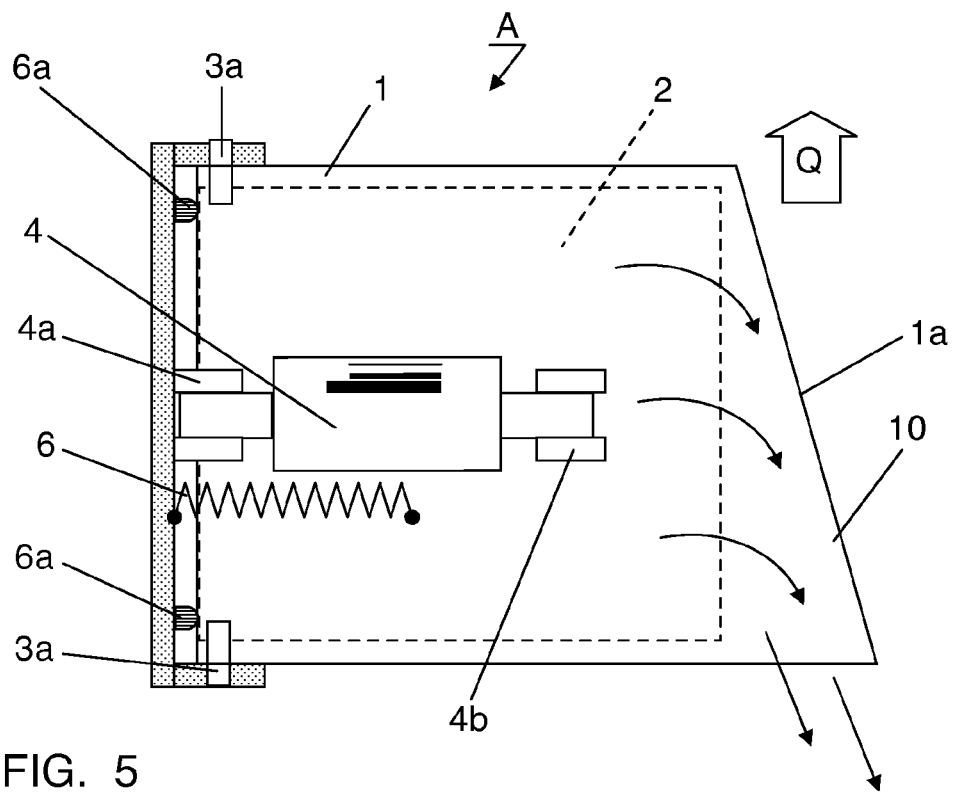
FIG. 5 is a plan view of a double trim tab with the most important elements for the trim function and integrated course correction element

FIG. 5 shows a plan view of double trim tab A with flow interceptor 1 with course correction device 10, bottom tab 2, both hinge-mounted by means of hinge 3a and actuation cylinder 4, which is supported via hinge mount 4a on transom 5 and is attached to flow interceptor 1 by hinge mount 4b. The return spring 6 is attached at one end to transom 5 and at the opposite end to bottom tab 2 through an opening (not shown) in flow interceptor 1.

As a result of non-parallel lowering of one of both flow interceptors 1, e.g. in the event of lateral inclination of a watercraft, uplift is not only generated at the desired position, but also leads to turning, that is to a course deviation of the watercraft, due to differing resistance values. To counteract this effect, flow interceptor end 1a is brought into a favorable form by means of course correction device 10 so that the water flow can also flow laterally along the inclined flow interceptor end 1a. The inclination can be linear or bow-shaped. This deflection flow stream generates a transverse force Q as counter-reaction—represented by the arrow Q—which counteracts the watercraft course drift and hence maintains the pre-selected course of the watercraft more accurately, meaning that less or even no counter-steering is required.

Figure 5A:
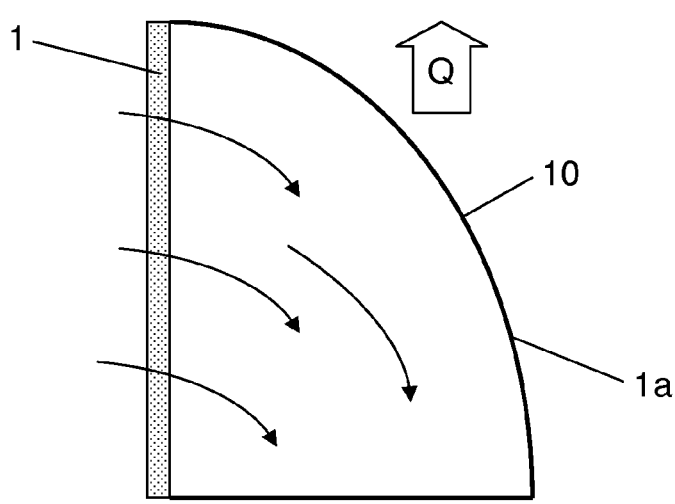
FIG. 5a is a plan view of a shortened flow interceptor with integrated course correction element

FIG. 5a shows a plan view of flow interceptor 1, which has turning elements or can be lowered in a linear fashion via a guidance device, with the flow interceptor end 1a and the course correction device 10, which generates the uplift and simultaneously also deflects the water flow sideways and thus generates transverse force Q—represented by arrow Q. The form of the course correction device 10 can be straight or arched.

Figure 6:
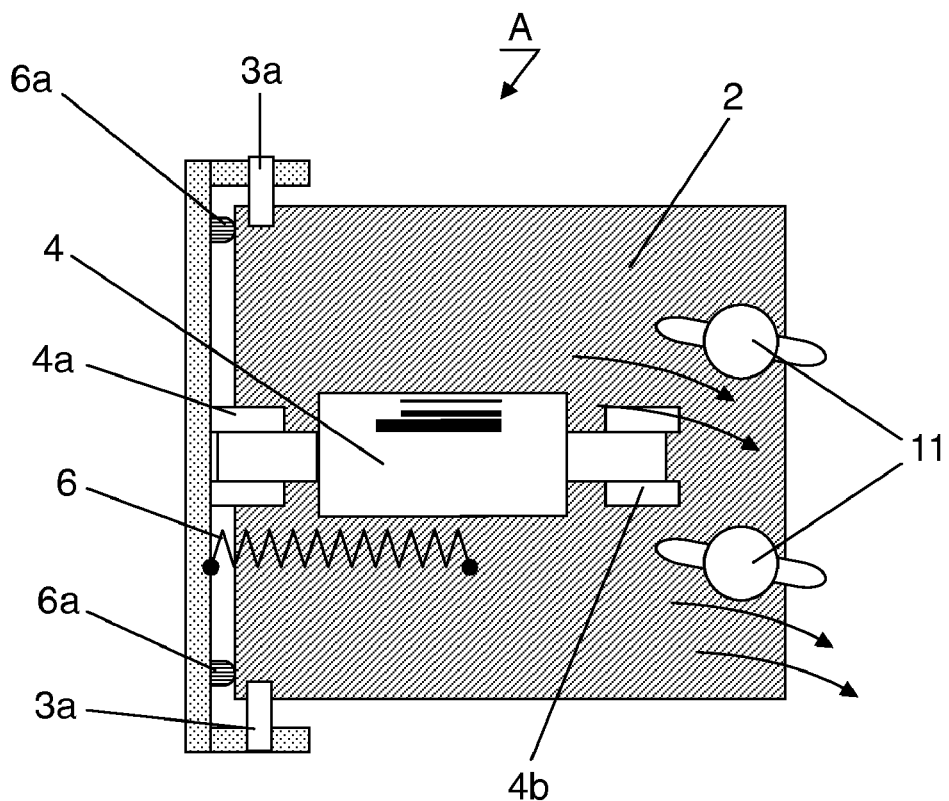
FIG. 6 is a plan view of a trim tab with separate course correction fins

FIG. 6 shows a plan view of bottom tab 2 with integrated course correction fins 11, which can also be hinge-mounted. Depending on the watercraft type, an optimized default setting can be chosen, so that the steering correction in the case of trim activation remains as small as possible.

Figure 7:
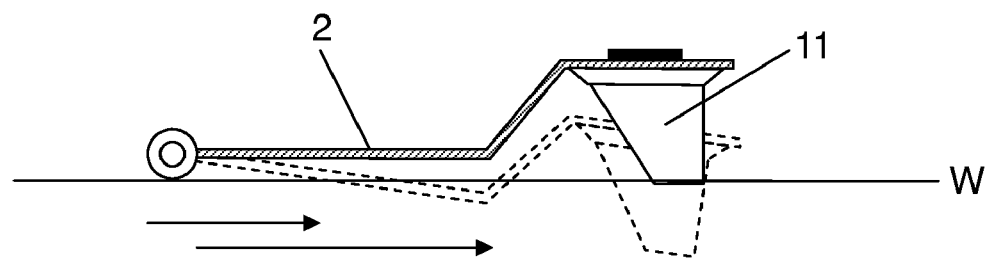
FIG. 7 is a side elevation of a tab with course correction fin and sketch of lowering into water flow

FIG. 7 shows a side elevation of bottom tab 2 with the integrated course correction fin 11, which when actuation cylinder is retracted hardly touches the waterline W. The broken lines represent a lowering of bottom tab 2 and the simultaneous submersion of course correction fin 11 in the water flow.

Figure 8:
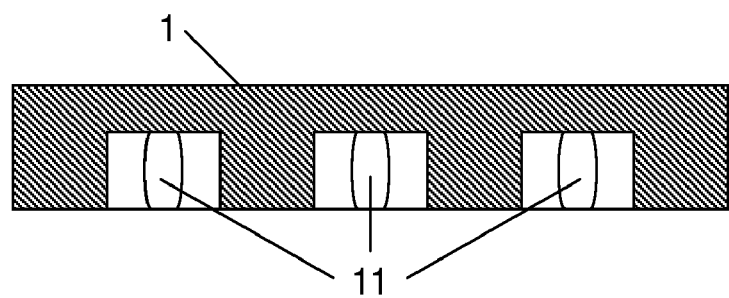
FIG. 8 is a rear elevation of a flow interceptor end with cut-outs for course correction fins

FIG. 8 shows a rear elevation of flow interceptor end 1a and the integrated course correction fins 11, which are fixed or hinge-mounted.

Figure 9:
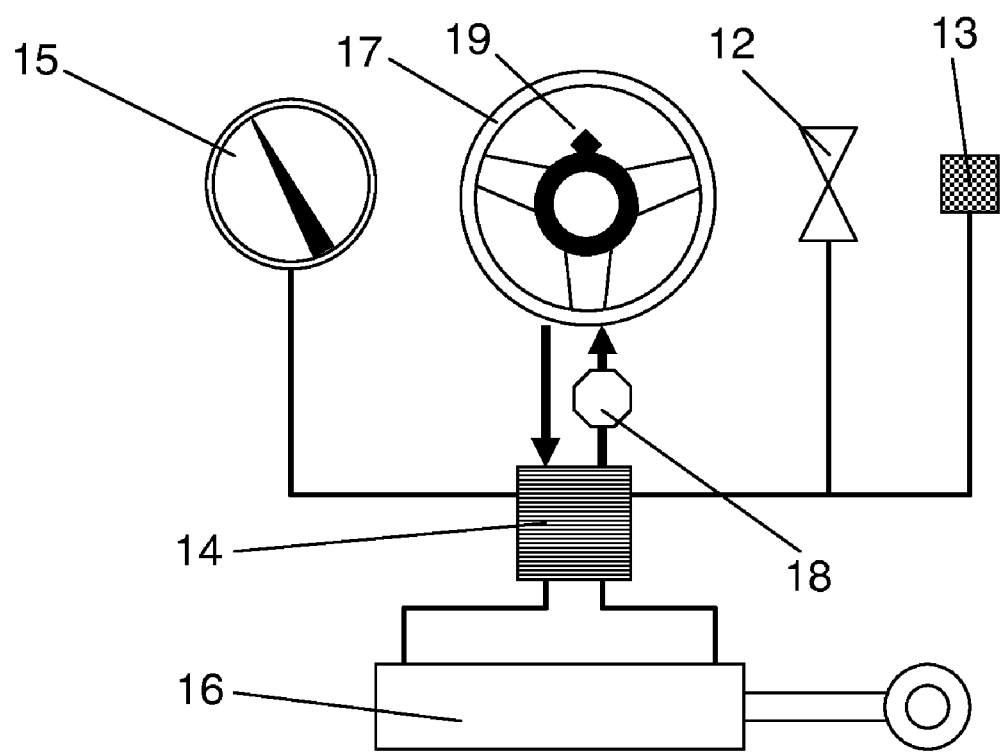
FIG. 9 is a functional diagram of electronic course correction using a steering actuator with steering wheel feedback neutralization Only components that are directly required for understanding the invention are shown.

FIG. 9 shows a functional diagram of an electronic course correction system, which in this case suppresses steering wheel feedback. Actuation of switch 12 or signal generation by electronic position sensor 13 to activate double trim tab A in the event of non-parallel operation of double trim tab A immediately results in a course drift of the watercraft, which is corrected by course correction device 10 or course correction fin 11 and or by electronic steering device 14. This effect is a result of the circumstance that upon activation of switch 12 or signal generation of position sensor 13, steering device 14 measures the actual course of the watercraft via the electronic compass 15, saves the value and only thereafter is double trim tab A activated and in the event of deviation from course, gives the order to actuator 16 of the watercraft rudder or Z-drive or outboard motor, to carry out a corresponding steering movement, to maintain the previously saved course value. Electronic compass 15 can be a magnetic field probe- or a GPS device or similar.

It is vital that in the event of a change in rudder position or of the Z-drive steering angle or outboard motor steering angle by means of actuator 16, the steering wheel 17 is not moved on account of uncoupling device 18, so that the helmsman himself does not counterproductively counter-steer against the automatic steering movement in the event of an automatic course correction.

In the case of electric steering, uncoupling device 18 will not relay the corresponding steering signal to the steering wheel, in the case of a hydraulic system the uncoupling device 18 is uncoupled by means of a valve or a mechanical clutch or similar.

Steering device 14 accepts a certain drift window, i.e. a corresponding course deviation tolerance to avoid having to reset actuator 16 constantly. On the other hand, steering device 14 also permits a tolerance in the steering wheel movement. However, if steering wheel 17 is turned beyond a particular angle, which is recorded by rotation angle sensor 19 on steering wheel 17, the course correction is cancelled and actuator 16 is automatically set in the standard position relationship between steering wheel 17 and rudder position or Z-drive or outboard motor.

The application of the invention is naturally not just limited to the design examples shown and described.

REFERENCE MARK LIST

1 Flow interceptor
1a Flow interceptor end
2 Bottom tab
3a, 3b Hinge
4 Actuation cylinder
4a, 4b Bearing
5 Transom
6 Return spring
6a Limit stop
7 Connecting device
8 Stern 9 Front flow interceptor
10 Course correction device
11 Course correction fin
12 Switch
13 Position sensor
14 Steering device
15 Electronic compasses
16 Actuator
17 Steering wheel
18 Uncoupling device
19 Rotation angle sensor
A Double trim tab
L Uplift force
Q Transverse force

The invention claimed is:

1. A double trim tab (A) for watercraft, comprising:
a bottom tab (2), said bottom tab configured for mounting to a watercraft;
a flow interceptor (1) pivotally mounted at an upper side of the bottom tab to pivot toward and away from the bottom tab about a first laterally-extending axis, said flow interceptor including a flow interceptor end (1a) extending toward the bottom tab to overlap one of a forward edge and a rear edge of the bottom tab extending generally laterally between outer longitudinal sides of the bottom tab; and
an actuator (4) connected to the flow interceptor and configured for mounting to the watercraft for upwardly and downwardly pivoting the flow interceptor between a raised position with the flow interceptor end above a bottom surface of the bottom tab, and a lowered position with the flow interceptor end extending below the bottom surface of the bottom tab.

2. A double trim tab as claimed in claim 1, wherein the bottom tab (2) is configured for pivotal movement about a second laterally-extending axis at the watercraft, with a return spring (6) for upward movement and a limit stop (6a) for limiting upward movement.

3. A double trim tab as claimed in claim 2, wherein the bottom tab (2) is pivotal downward about the second axis from a position at the limit stop (6a), by pivoting the flow interceptor (1) downward beyond an intermediate position where the flow interceptor contacts the bottom tab.

4. A double trim tab as claimed in claim 2, wherein the bottom tab (2) includes hinges (3a, 3b) for defining the second laterally-extending axis.

5. A double trim tab as claimed in claim 2, further comprising a flexible connecting element (7) connected between the bottom tab (2) and the flow interceptor (1).

6. A double trim tab as claimed in claim 1, wherein the flow interceptor (1) includes a course correction device (10).

7. A double trim tab as claimed in claim 6, wherein the course correction device (10) is formed by the flow interceptor end (1a) being closer to the first axis at one side of the flow interceptor (1) and more distant from the first axis at the other side of the flow interceptor.

8. A double trim tab as claimed in claim 1, wherein the actuator includes an electric drive.

9. A double trim tab as claimed in claim 1, wherein the actuator includes a fluid cylinder.

10. A double trim tab as claimed in claim 1, wherein the fluid cylinder includes a lift locking device.

11. A watercraft having a double trim tab (A), said double trim tab comprising:
a bottom tab (2) mounted to said watercraft;
a flow interceptor (1) mounted at an upper side of the bottom tab to pivot toward and away from the bottom tab about a first laterally-extending axis, said flow interceptor including a flow interceptor end (1a) extending toward the bottom tab to overlap one of a forward edge and a rear edge of the bottom tab extending generally laterally between outer longitudinal sides of the bottom tab; and
an actuator (4) connected between the flow interceptor and the watercraft for upwardly and downwardly pivoting the flow interceptor between a raised position with the flow interceptor end above a bottom surface of the bottom tab, and a lowered position with the flow interceptor end extending below the bottom surface of the bottom tab.

12. A watercraft as claimed in claim 11, wherein the bottom tab is fixedly mounted at a stern of the watercraft.

13. A watercraft as claimed in claim 11, wherein the bottom tab is hingedly mounted at a stern of the watercraft for pivotal motion about a second laterally-extending axis.

14. A watercraft as claimed in claim 13, wherein the bottom tab is pivotal downward about the second axis, by pivoting the flow interceptor (1) downward beyond an intermediate position where the flow interceptor contacts the bottom tab.

15. A watercraft as claimed in claim 14, further comprising a switch (12) that is configured to operate the steering device (14) when the actuator (4) is operated.

16. A watercraft as claimed in claim 11, wherein the flow interceptor (1) includes a course correction device (10) and the watercraft includes a steering device (14) configured to assist the course correction device during actuation of the double trim tab (A).

* * * * *